(12) United States Patent
Muramatsu et al.

(10) Patent No.: US 12,055,796 B2
(45) Date of Patent: Aug. 6, 2024

(54) LENS AND METHOD FOR MANUFACTURING LENS

(71) Applicant: CARL ZEISS VISION INTERNATIONAL GMBH, Aalen (DE)

(72) Inventors: Akihiro Muramatsu, Marugame (JP); Yoshinobu Okada, Niihama (JP); Hirofumi Asada, Niihama (JP); Akifumi Aono, Nagoya (JP)

(73) Assignee: CARL ZEISS VISION INTERNATIONAL GMBH, Aalen (DE)

( * ) Notice: Subject to any disclaimer, the term of this patent is extended or adjusted under 35 U.S.C. 154(b) by 943 days.

(21) Appl. No.: 16/968,102

(22) PCT Filed: Feb. 7, 2019

(86) PCT No.: PCT/JP2019/004354
§ 371 (c)(1),
(2) Date: Aug. 6, 2020

(87) PCT Pub. No.: WO2019/156143
PCT Pub. Date: Aug. 15, 2019

(65) Prior Publication Data
US 2021/0026159 A1    Jan. 28, 2021

(30) Foreign Application Priority Data
Feb. 9, 2018   (JP) .................................. 2018-022153

(51) Int. Cl.
*G02C 7/10*     (2006.01)
*B29D 11/00*    (2006.01)

(52) U.S. Cl.
CPC .......... *G02C 7/102* (2013.01); *B29D 11/0073* (2013.01); *B29D 11/00807* (2013.01); *G02C 7/101* (2013.01); *G02C 2202/16* (2013.01)

(58) Field of Classification Search
CPC . G02C 7/10; G02C 7/06; G02C 7/102; G02C 7/1025; G02C 7/101; G02C 7/104;
(Continued)

(56) References Cited

U.S. PATENT DOCUMENTS 8,830,408 B2    9/2014 Haddock et al.
2008/0186448 A1*   8/2008 Ishak ...................... G02C 7/108
                                                            351/159.6
(Continued)

FOREIGN PATENT DOCUMENTS

CN    103499889 A    1/2014
JP    2012155328 A   8/2012
(Continued)

OTHER PUBLICATIONS

Partial supplementary European search report dated Oct. 20, 2021.
(Continued)

*Primary Examiner* — Jie Lei
(74) *Attorney, Agent, or Firm* — Shih IP Law Group, PLLC

(57) ABSTRACT

An eyewear lens according to the present invention is configured so as to be provided with: a transparent first substrate having a principal surface; a second substrate disposed facing the principal surface, the transmittance thereof with respect to light in a predetermined wavelength region being different from that of the first substrate; an electric element in which optical characteristics thereof is changed by electrical control, the electric element being provided between the first substrate and the second sub-
(Continued)

strate; and an adhesive layer provided between the first substrate and the second substrate.

11 Claims, 8 Drawing Sheets

(58) Field of Classification Search
CPC .... G02C 7/083; G02C 7/061; G02C 2202/16; G02B 5/22; G02B 5/23; G02B 3/14; B29D 11/00; B29D 11/0073; B29D 11/00807; B29D 11/00817; B29D 11/00028
USPC ............ 351/159.42, 159.44, 159.39, 159.01, 351/159.02, 159.03, 159.73, 159.74, 351/159.75
See application file for complete search history.

(56) References Cited

U.S. PATENT DOCUMENTS

2008/0278681 A1* 11/2008 Blum .................... G02C 7/061 351/159.42
2011/0075096 A1   3/2011  Ishak
2013/0037202 A1   2/2013  Ando
2013/0224440 A1   8/2013  Trajkovska
2014/0028966 A1   1/2014  Blum et al.
2018/0340044 A1  11/2018  Kakinuma

FOREIGN PATENT DOCUMENTS

| JP | 2012522270 A | 9/2012 |
| JP | 2015511893 A | 4/2015 |
| JP | 2015-522842 A | 8/2015 |
| WO | 2009079342 A1 | 6/2009 |
| WO | 2011093530 A1 | 8/2011 |
| WO | 2017047685 A1 | 3/2017 |

OTHER PUBLICATIONS

International Search Report from International Application No. PCT/JP2019/004354, mailed May 14, 2019.

* cited by examiner

LENS AND METHOD FOR MANUFACTURING LENS

TECHNICAL FIELD

The present invention relates to a lens for an eyewear and a method for manufacturing a lens.

BACKGROUND ART

Conventionally, an electric element driven by the application of a driving voltage, for example, an eyewear comprising a lens having a liquid crystal lens with changeable refractive index has been developed (see, for example, Patent Literature 1).

CITATION LIST

Patent Literature

PTL 1
Japanese Patent Application Laid-Open No. 2015-522842

SUMMARY OF INVENTION

Technical Problem

In the above-described eyewear, it is desirable to provide a lens having optical characteristics according to an application.

The present invention has been made in view of such a situation, and an object thereof is to provide a lens having optical characteristics according to an application.

Solution to Problem

The lens according to the present invention is a lens for an eyewear, comprising: a first substrate having a main surface, the first substrate being transparent; a second substrate disposed opposite to the main surface and having a transmittance with respect to a light in a predetermined wavelength range, the transmittance being different from that of the first substrate; an electrical element provided between the first substrate and the second substrate and having optical characteristics which are changed by electrical control; and an adhesive layer provided between the first substrate and the second substrate.

The method of manufacturing a lens according to the present invention is a method for manufacturing a lens for an eyewear, comprising: providing an electrical element having optical characteristics which are changed by electrical control on a first substrate; and fixing a second substrate having a transmittance with respect to a light in a predetermined wavelength range to the first substrate, the transmittance being different from that of the first substrate.

Advantageous Effects of Invention

According to the present invention, it is possible to provide a lens having optical characteristics according to an application.

DESCRIPTION OF EMBODIMENT

Hereinafter, preferred embodiments of the present disclosure will be described in detail with reference to the appended drawings. In the following description, as a typical example of a lens for an eyewear according to the present invention, a lens for visual acuity correction having an electric element whose optical characteristics can be changed by electrical control will be described.

Embodiment 1

With reference to FIGS. 1 to 4, electronic glasses 100 according to Embodiment 1 of the present invention will be described.

<Electronic Glasses>

Figure 1:
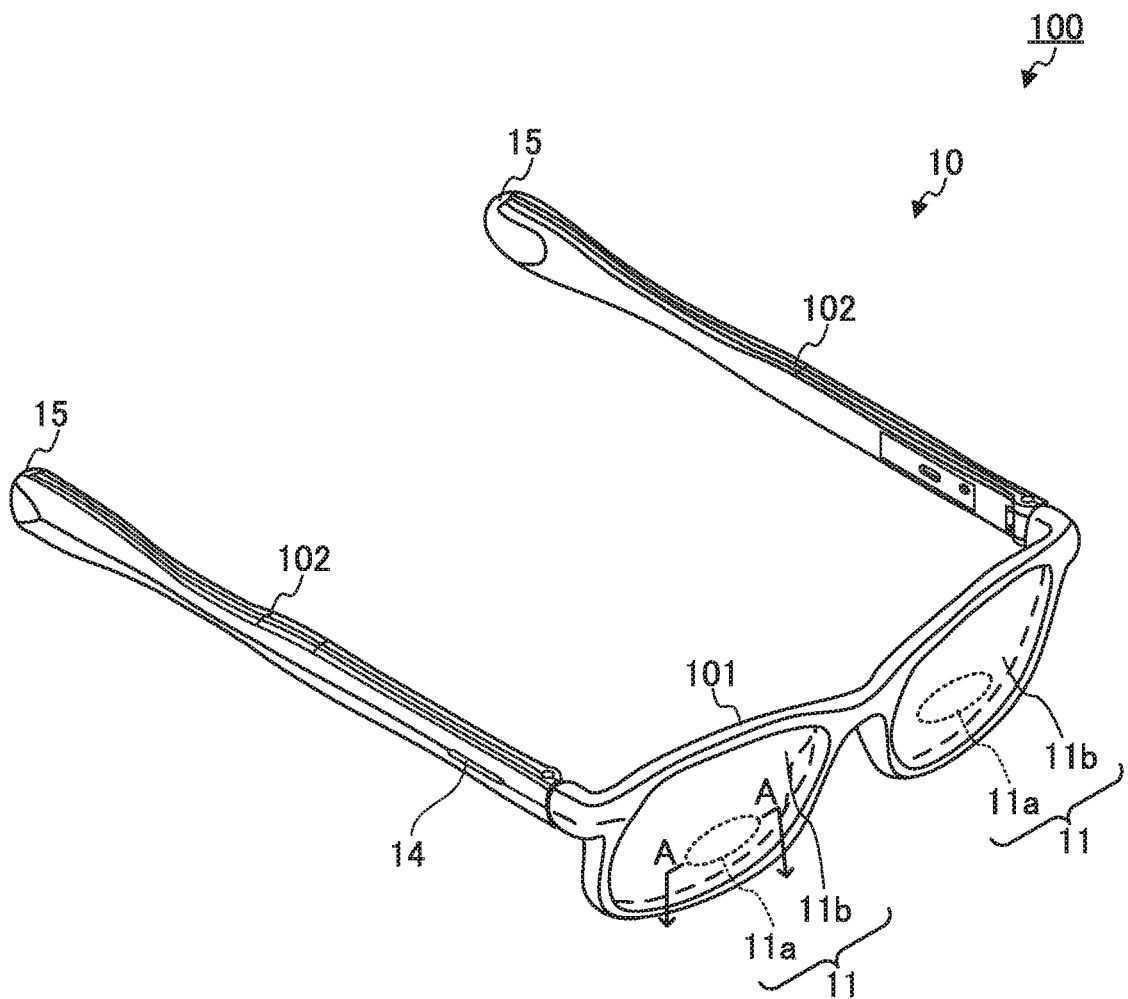
FIG. 1 is a perspective view of the electronic glasses according to Embodiment 1 of the present invention.
Figure 1:
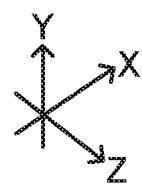
Figure 2:
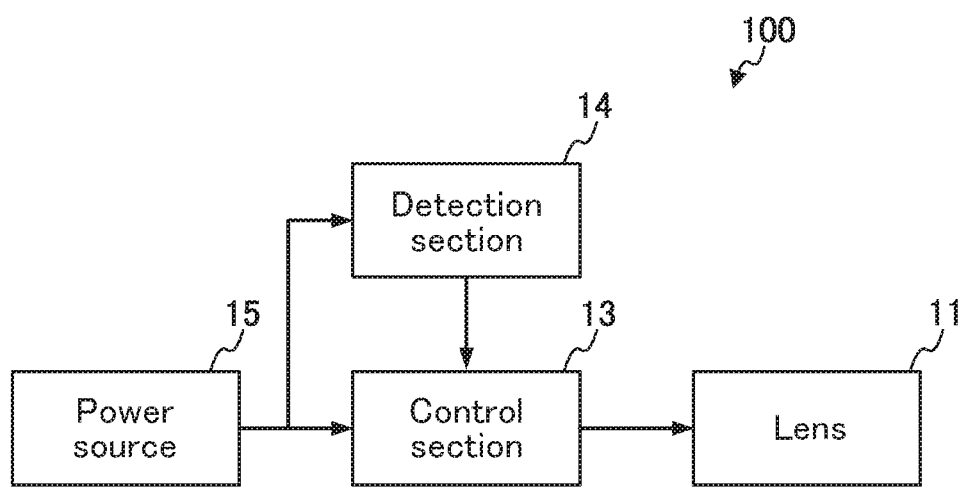
FIG. 2 is a block diagram showing an internal circuit of the electronic glasses.

FIG. 1 is a perspective view showing an example of a configuration of electronic glasses 100 according to the present embodiment. FIG. 2 is a block diagram showing an internal circuit of electronic glasses 100. Electronic glasses 100 comprises frame 10, pair of lenses 11, control section 13, detection section 14, and pair of power sources 15.

<Frame>

Frame 10 includes front 101 and pair of temples 102. It should be noted that, hereinafter, the section where front 101 is disposed is referred to as the front of electronic glasses 100 (forward). Pair of temples 102 holds control section 13, detection section 14, and pair of power sources 15. Note that pair of power sources 15 may be only one of them. In this case, power source 15 is held only by one temple 102 of pair of temples 102, for example, temple 102 for the right ear.

A user of electronic glasses 100 (a wearer) switches the optical characteristics of liquid crystal lens section 11a of lens 11 (e.g., transmittance) by operating detection section 14 provided on temple 102 (e.g., touch operation).

When detection section 14 is operated by the user, control section 13, based on the operation, switches between a state of applying a voltage to liquid crystal lens section 11a and a state of not applying a voltage to liquid crystal lens section 11a.

<Lens>

Figure 3:
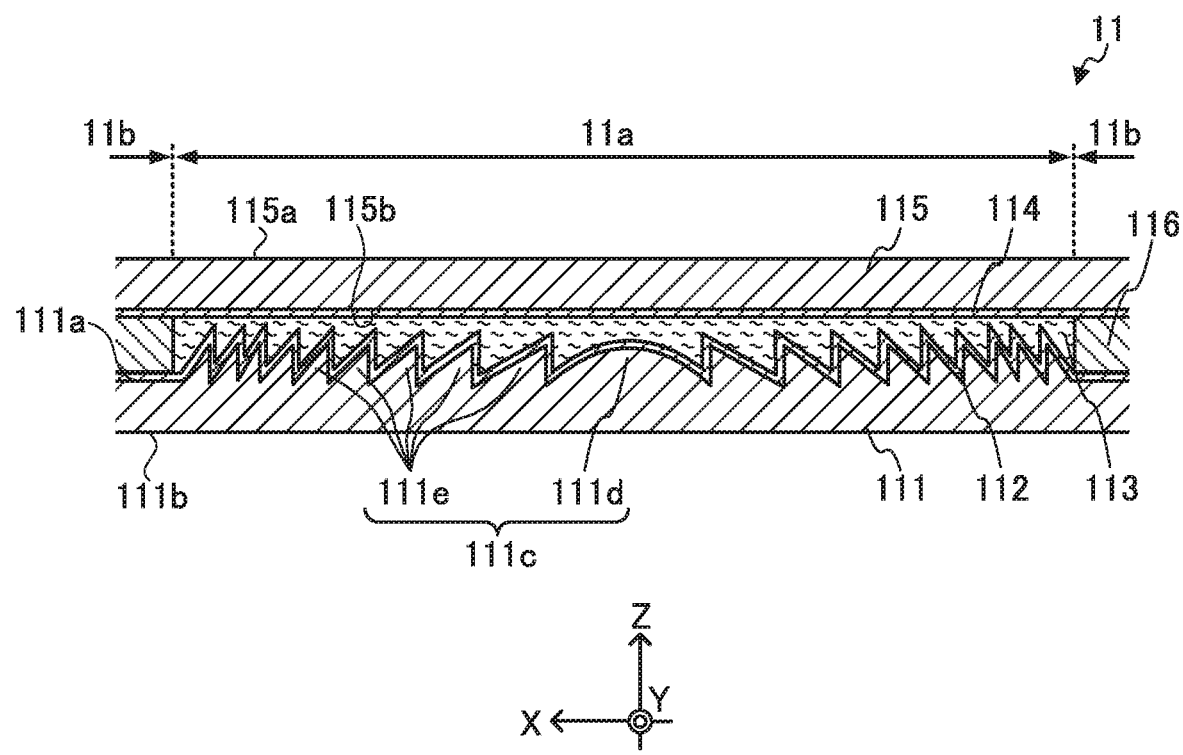
FIG. 3 is a sectional view taken along line A-A of FIG. 1.
Figure 4:
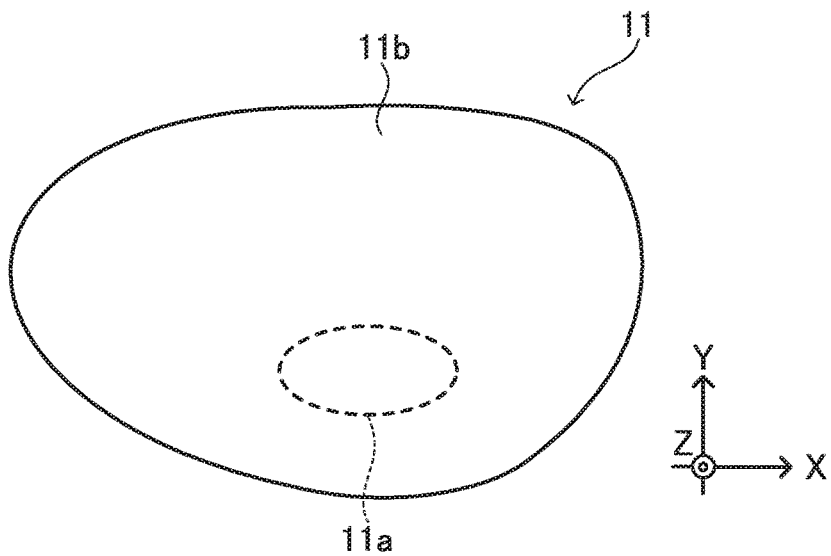
FIG. 4 is a front view of the lens.

FIG. 3 is a sectional view taken along line A-A of FIG. 1. FIG. 4 shows lens 11 arranged on the left side when electronic glasses 100 is viewed from the front.

Hereinafter, in explaining the configuration of lens 11, for convenience of explanation, a orthogonal coordinate system (X, Y, Z) is applied. The orthogonal coordinate system (X, Y, Z) shown in each figure is a common orthogonal coordinate system.

The X direction coincides with the left and right direction of the user in a state where the user wears an eyewear (hereinafter, simply referred to as a "wearing state"). The Y direction coincides with the vertical direction of the user in the wearing state. Z direction coincides with the front-rear direction of the user and the direction of the optical axis of lens 11 in the wearing state.

In the following description, the "thickness direction" means the thickness direction of lens 11 unless otherwise noted. The thickness direction coincides with the Z direction of the above-described orthogonal coordinate system.

Further, the "surface" of each member is the surface on the far side from the user (the plus side in Z direction) in the wearing state. On the other hand, the "back surface" of each member is the surface closer to the user (the minus side in Z-direction) in the wearing state.

In this embodiment, lens 11 is curved convexly toward the plus side in Z direction. However, in FIG. 3, the curvature of lens 11 is shown as zero.

Pair of lenses 11, when viewed from the front of electron glasses 100, is formed so as to be symmetrical, and have the same components to each other. Therefore, in the following description, lens 11 for the right eye of electronic glasses 100 will be described, and the description of lens 11 for the left eye will be omitted.

Lens 11 includes liquid crystal lens section 11a, and normal lens section 11b which is a section other than liquid crystal lens section 11a.

Liquid crystal lens section 11a is capable of switching its focal length (strength) by a voltage. As shown in FIG. 3, liquid crystal lens section 11a includes first substrate 111, first electrode 112, liquid crystal layer 113, second electrode 114, and second substrate 115 in order from the rear side (the minus side in Z direction). First electrode 112, liquid crystal layer 113, and second electrode 114 constitute an electric element.

Normal lens section 11b includes first substrate 111, first electrode 112, adhesive layer 116, second electrode 114, and second substrate 115 in order from the rear side. Liquid crystal lens section 11a and normal lens section 11b share first substrate 111, first electrode 112, second electrode 114, and second substrate 115. Each component of liquid crystal lens section 11a and normal lens section 11b has a light-transmitting property with respect to visible light.

<First Substrate>

First substrate 111 is a plate-like member curved convexly toward the plus side in Z direction (the upper side in FIG. 3). Surface 111a of first substrate 111 is a convex curved surface which is curves convexly toward the plus side in Z direction. Back surface 111b of first substrate 111 is a concave curved surface which is curved concavely toward the plus side in Z direction.

The thickness dimension of first substrate 111 in the direction of the optical axis of lens 11 varies depending on the position. For example, in the case of a lens for myopia correction (also referred to as a negative lens), first substrate 111 has the largest thickness dimension at the outer peripheral edge. In the case of a lens for hyperopia correction (also referred to as a positive lens), first substrate 111 has the smallest thickness dimension at the outer peripheral edge. The thickness dimension in the direction of the optical axis of lens 11 may be equal throughout first substrate 111.

Each of surface 111a and back surface 111b may be a spherical surface having a single curvature, or may be a composite curved surface having a plurality of curvatures. In addition, at least one of surface 111a and back surface 111b may be flat.

First substrate 111 has diffraction region 111c in a section of surface 111a corresponding to liquid crystal lens section 11a. Diffraction region 111c includes hemispherical convex section 111d arranged at the center section and a plurality of annular first convex streaks 111e arranged on concentric circles with convex section 111d as the center.

As an example of the shape of convex section 111d and first convex streak 111e, a Fresnel lens shape can be cited. Note that convex section 111d and first convex streak 111e may be partially in the shape of a Fresnel lens, or may be entirely in the shape of a Fresnel lens.

First substrate 111 is made of inorganic glass or organic glass. First substrate 111 is preferably made of organic glass. Organic glasses are either thermosetting materials consisting of thermosetting polyurethanes, polythiourethanes, polyepoxides, or polyepisulfides, or thermoplastic materials consisting of poly(meth)acrylates, or thermosetting (cross-linked) materials consisting of copolymers or mixtures thereof. However, the material of first substrate 111 is not limited thereto, and a known material used as a material of a lens may be employed. In addition, in the viewpoint of reducing the thickness of the lens, it is preferable that the refractive index of first substrate 111 and the refractive index of second substrate 115 be high. The refractive index of first substrate 111 and the refractive index of second substrate 115 are preferably 1.55 or more, and more preferably 1.65 or more.

<First Electrode and Second Electrode>

First electrode 112 and second electrode 114 are a pair of transparent electrodes having a light-transmitting property. First electrode 112 is disposed between first substrate 111 and liquid crystal layer 113. Second electrode 114 is disposed between liquid crystal layer 113 and second substrate 115.

First electrode 112 and second electrode 114 may be disposed over a extent capable of applying a voltage to at least liquid crystal layer 113 (liquid crystal lens section 11a).

The materials of first electrode 112 and second electrode 114 are not particularly limited as long as they have desired light-transmitting properties and conductivity. As examples of the materials of first electrode 112 and second electrode 114, indium tin oxide (ITO) and zinc oxide (ZnO) are cited. The materials of first electrode 112 and second electrode 114 may be the same or different from each other.

<Liquid Crystal Layer>

Liquid crystal layer 113 is disposed between first electrode 112 and second electrode 114. The liquid crystal layer 113 is configured such that its refractive index varies according to the presence or absence of the application of a voltage.

For example, the refractive index of liquid crystal layer 113 is adjusted to be approximately the same as the refractive index of first substrate 111 and the refractive index of second substrate 115 in a state where no voltage is applied to liquid crystal layer 113. On the other hand, the refractive index of liquid crystal layer 113 is adjusted to be different from the refractive index of first substrate 111 and the refractive index of second substrate 115 in a state where a voltage is applied to liquid crystal layer 113.

Liquid crystal layer 113 contains a liquid crystal material. The alignment state of the liquid crystal material when a voltage is applied and the alignment state of the liquid crystal material when a voltage is not applied are different from each other. The liquid crystal material may be appropriately selected according to the refractive index of first substrate 111 and the refractive index of second substrate 115. For example, the liquid crystal material may be composed of cholesteric liquid crystal, nematic liquid crystal, or the like.

<Second Substrate>

Second substrate 115 is disposed ahead of first substrate 111 so as to face surface 111a of first substrate 111. Second substrate 115 is a plate-like curved convexly toward the front side. Surface 115a of second substrate 115 is a convex curved surface that curves convexly toward the plus side in Z direction. Back surface 115b of first substrate 111 is a concave curved surface which is curved concavely toward the plus side in Z direction.

The thickness dimension of second substrate 115 in the direction of the optical axis of lens 11 is equal throughout. In the case where the thickness dimension of second substrate 115 in the direction of the optical axis of lens 11 is equal in the present embodiment, an error of ±10% (±0.1 W) may be acceptable. The thickness dimension of second substrate 115 in the direction of the optical axis of lens 11 may vary depending on the position. Each of surface 115a and back surface 115b may be a spherical surface having a single curvature, or may be a composite curved surface having a plurality of curvatures. In addition, at least one of surface 115a and back surface 115b may be flat.

Second substrate 115 has a transmittance for light in a predetermined wavelength range different from that of first substrate 111. For this purpose, second substrate 115 includes an additive which is not included in first substrate 111. The base material of second substrate 115 is the same as that of first substrate 111. The refractive index of second substrate 115 (second refractive index) is equal to the refractive index of first substrate 111 (first refractive index). In the case where the first refractive index is equal to the second refractive index in the present embodiment, a range in which the difference between the first refractive index and the second refractive index is ±0.1 may be acceptable.

Additives include photochromic compounds, selective absorbers which selectively absorb ultraviolet rays (hereinafter referred to as "ultraviolet absorbers"), selective absorbers which selectively absorb blue light being high-energy visible light (400-500 nm, in particular, short wavelength light of 400-420 nm) (hereinafter referred to as "blue selective absorbers"), rare earth metal compounds (e.g., neodymium compounds), organic dyes (e.g., porphyrin compounds), and the like.

The lens to which the photochromic compound is added functions as a transparent lens indoors, and functions as a protector to protect the eyes from glare by developing a color such as gray or brown in response to sunlight (ultraviolet rays) outdoors. A state in which a lens including a photochromic compound does not develop color may be referred to as a normal state of the second substrate. A state in which a lens including a photochromic compound develops color is referred to as a color development state of the second substrate. The glasses having such lenses are highly functional glasses which can handle uses for both of indoors and outdoors, and their demand has been increasing in recent years.

As the photochromic compound, various kinds of compounds can be used. Examples of the photochromic compound include photochromic compounds described in WO 2012/141306, Japanese Patent Application Laid-Open No. 2004-78052, WO 2014/208994, Japanese Patent Application Laid-Open No. 8-272036, Japanese Patent Application Laid-Open No. 2005-23238, and Japanese Patent Application Laid-Open No. 2008-30439.

Specifically, as the photochromic compound, the photochromic compound which is obtained by mixing one or two or more photochromic compounds selected, depending on the desired coloring, from among spiropyran-based compounds, chromene-based compounds, spirooxazine-based compounds, fulgide-based compounds, and bisimidazole-based compounds, is cited.

Further, the photochromic compound can be synthesized by a known method. For example, it can be obtained by the methods described in Japanese Unexamined Patent Application Publication No. 2004-500319, WO 2009/146509, WO 2010/20770, WO 2012/149599, and WO 2012/162725.

A lens to which an ultraviolet absorber is added can protect eyes and the like from damage caused by ultraviolet rays. In recent years, ultraviolet rays having a wavelength of 400 nm or less have been known to adversely affect the cornea and the crystalline lens, and there has been a demand for a lens capable of effectively absorbing such ultraviolet rays.

For example, in the case where iso (thio) cyanate, polythiol which is a polyurethane-based resin raw material is used for first substrate 111 and second substrate 115, a benzotriazole-based ultraviolet absorber such as 2-[2-hydroxy-3-(dimethylbenzyl)-5-(1,1,3,3-tetramethylbutyl)phenyl]-2H-benzotriazole, isooctyl-3-(3-(2H-benzotriazol-2-yl)-5-t-butyl-4-hydroxyphenylpropionate, 2-[2-hydroxy-3, 5-bis(dimethylbenzyl)phenyl]-2H-benzotriazole, is added to produce a polyurethane-based resin. Such a polyurethane-based resin has a colorless transparent and high ultraviolet cut ratio without deterioration in optical characteristics. In the case where a resin plate having a composition similar to that of first substrate 111 and second substrate 115 and a width of 9 mm is prepared from such a polyurethane-based resin, the light cut ratio of the resin plate to 400 nm light is 99.8% or more.

The UV absorber is preferably at least one selected from a group consisting of 2-[2-hydroxy-3-(dimethylbenzyl)-5-(1,1,3,3-tetramethylbutyl)phenyl]-2H-benzotriazol, isooctyl-3-(3-(2H-benzotriazol-2-yl)-5-t-butyl-4-hydroxyphenyl-propionate, 2-(3,5-di-t-butyl-2-hydroxyphenyl) benzotriazole, 2-(3,5-di-t-pentyl-2-hydroxyphenyl) benzotriazole, 2-[2-hydroxy-3,5-bis(dimethylbenzyl) phenyl]-2H-benzotriazole, and 2-(3,5-di-t-butyl-2-hydroxyphenyl)-5-chlorobenzotriazole.

Further, the amount of the ultraviolet absorber for ultraviolet absorption is preferably 0.03 to 1.5 wt %, more preferably 0.05 to 0.5 wt %, based on the polymerizable composition.

The ultraviolet absorber for the purpose of cutting high-energy visible light (having a wavelength in the range of 400 to 420 nm) is not particularly limited as long as it has a maximum absorption wavelength of 350 nm or more and 370 nm or less when dissolved in a chloroform solution, but can be compound of a benzotriazole-based compound, a benzophenone-based compound, or a salicylic acid ester-based compound. The ultraviolet absorber is preferably compound of 1 or more of these ultraviolet absorbers, and may be compound of 2 or more different ultraviolet absorbers. For example, an ultraviolet absorber is preferably composed of 2-(2-hydroxy-3-t-butyl-5-methylphenyl)-chlorobenzotriazole, which is a benzotriazole-based compound.

The amount added of the ultraviolet absorber for the purpose of cutting the high-energy visible light is in the range of 0.3 to 2% by weight, preferably 0.3 to 1.5% by weight, and more preferably 0.3 to 1.2% by weight based on the total weight of the resin for an optical material or the polymerizable compound.

In the case of cutting high-energy visible light, in a test specimen having the same composition as first substrate 111 and second substrate 115 containing an ultraviolet absorber and having a thickness of 2 mm, the light transmittance of the test specimen with respect to light having a wavelength of 440 nm is 80% or more, preferably 85% or more, the light transmittance of the test specimen with respect to light having a wavelength of 420 nm is 70% or less, preferably 50% or less, and the light transmittance of the test specimen with respect to light having a wavelength of 410 nm is 10% or less, preferably 5% or less.

Within the range of the above-described light transmittance, a lens having a high blocking effect on blue light having a wavelength of about 420 nm, having a property of colorless transparent, and excellent appearance can be obtained. In addition, by setting the light transmittance to light having a wavelength of 440 nm to 80% or more, a formed body (optical material) which is colorless transparent and has an excellent appearance can be obtained. These numerical ranges may be combined accordingly.

In addition, a lens to which a blue selective absorber is added can protect the eyes and the like from obstructions by high-energy visible light (HEV light: light having wavelengths of 400 nm to 500 nm). In recent years, high-energy visible light is considered to be a cause of age-related macular degeneration in the long term since it reaches to the retina. In particular, short-wavelength light with a wavelength of 400 to 420 nm is considered to damage retinal cells. Therefore, a lens capable of cutting light with a wavelength of 400 to 420 nm (also referred to as visible short-wavelength region) among high-energy visible light is required. Such lenses can reduce damages to retinal cells and therefore, reduce the cause of age-related macular degeneration. The lens preferably has a light cut rate of about 5% or less with respect to light having a wavelength of 420 nm.

The rare earth metal compound imparts a sharp-looking effect by enhancing the contrast and an anti-glare effect. Since, in the rare earth metal compound, the peak shape of the absorption spectrum in the absorption wavelength band in the visible light region is extremely sharp, the rare earth metal compound has a narrow range of wavelengths that can be absorbed. Therefore, the rare earth metal compound can selectively block light in a wavelength band that easily gives glare. Since, due to such a characteristic of the rare earth metal compound, a wavelength band required for visibility can be transmitted, and a wavelength band adversely affecting antiglare properties can be selectively absorbed, a lens having both antiglare properties and visibility can be realized. For example, in the case where a rare earth metal compound capable of wavelength-selectively absorbing visible light having a wavelength around 585 nm is added to a lens, effective anti-glare properties can be obtained.

Such a rare earth metal compound may be a compound containing a rare earth metal ion. The rare earth metal ion may be appropriately selected in accordance with the required optical characteristics, i.e., light absorption characteristics. For example, trivalent neodymium ions have an absorption peak around 575 nm and 525 nm in the visible light range. In addition, the trivalent erbium ion has an absorption peak around 520 nm. Also, the trivalent praseodymium ion has an absorption peak around 575 nm and 445 nm. Also, trivalent holmium ions have an absorption peak around 535 nm and 450 nm. Considering the absorption peaks of such rare earth metal ions, a rare earth metal may be selected accordingly for each application.

The rare earth metal ion which may be employed in the present embodiment may be selected from neodymium, erbium, praseodymium, holmium, dysprosium, thulium, ytterbium, and lutetium as an example. The rare earth metal ion is preferably selected from neodymium, erbium, praseodymium, and holmium. Further, the rare earth metal ion is more preferably selected from neodymium and erbium. As the rare earth metal ion, neodymium is most preferred. Note that the number of the type of rare earth metal ions contained in the rare earth metal compound may be one or more. As an example, neodymium ions may be used alone or in combination with erbium ions for the purpose of producing a filter through which clear vision can be provided by enhancing the contrast of the three primary colors of light.

The lens to which the neodymium compound is added assists the ability to distinguish the difference in brightness and the difference in color by selectively cutting off yellow light having a wavelength around 585 nm to reduce glare. It is preferable that the lens to which the neodymium compound is added has a cut ratio of about 60% with respect to light having a wavelength of about 585 nm. Further, it is preferable that the lens to which the neodymium compound is added has a transmittance of 60% or more and 90% or less with respect to light having a wavelength of 580 nm.

Further, as the porphyrin compound, a compound is preferred, which has an absorption maximum wavelength in a wavelength region between 440 and 570 nm, and has a half width of an absorption peak of 10 nm or more and less than 40 nm, more preferably 15 nm or more and less than 35 nm in an absorption spectrum measured with an optical path length of 10 mm of a concentration 0.01 g/L toluene solution. Further, as the porphyrin compound, a compound having an absorption maximum wavelength in a wavelength region between 440 and 510 nm, and a compound having an absorption maximum wavelength in a wavelength region between 520 and 570 nm are more preferred.

Hereinafter, second substrate 115 to which the photochromic compound is added is referred to as a photochromic lens. Further, second substrate 115 to which a blue selective absorber is added is referred to as a blue light cut lens. Further, second substrate 115 to which the neodymium compound is added is referred to as neocontrast lens.

Methods of adding the photochromic compound to second substrate 115 include, for example, coating, dyeing, and kneading.

In the case of coating, second substrate 115 has a coating layer containing a photochromic compound on at least one surface (hereinafter referred to as a "coating surface") of surface 115a and back surface 115b. Such a coating layer is formed by coating a coating composition on a coating surface and curing the coating composition. Examples of the method of curing the coating composition include a method of photocuring by irradiating with a light energy beam such as ultraviolet rays or visible light (hereinafter referred to as a "photocuring method"), a method of thermally curing by application of thermal energy (hereinafter referred to as a "thermally curing method"), and the like. The coating processes are performed before second substrate 115 is fixed to first substrate 111.

In addition, in the case of dyeing, second substrate 115 is added a photochromic compound to by being immersed in a dyeing solution warmed to a predetermined temperature. Such a dyeing process is preferably performed in a state before second substrate 115 is fixed to first substrate 111.

In addition, in the case of kneading, second substrate 115 is formed by kneading a photochromic compound into a molten base material and pouring it into a mold to solidify it. Such a kneading process is naturally performed before second substrate 115 is fixed to first substrate 111.

Second substrate 115 to which the photochromic compound is added has a photochromic function which continuously varies between the transparent colored state and the transparent state according to the amount of light (ultraviolet rays)

For example, second substrate 115 to which the photochromic compound is added (kneaded) can suppress, in the color development state, the transmittance to light having a wavelength of 380 nm to 8% or less, preferably 5% or less, and more preferably 2% or less.

The photochromic performance (color development performance) of second substrate 115 containing the photochromic compound will be described. First, a test specimen (not shown) having a thickness of 2.0 mm with a composition equivalent to that of second substrate 115 containing a photochromic compound is provided. Next, using a handy UV lamp SLUV-6 manufactured by Azone, the above test specimen is irradiated with ultraviolet rays having a wavelength of 365 nm from a position having a height of 155 mm for 10 minutes. Then, using a color difference meter (CR-200 manufactured by Konica Minolta), the L* value, a* value, and b* value in the hues of the test specimen before and after UV-irradiation are measured. The photochromic performance (color development performance) of second substrate 115 containing the photochromic compound has a value ($\Delta E^*ab$) obtained by calculating the amount of change in hue from the following equation 1 based on the L* value, the a* value, and the b* value before and after UV irradiation, which is preferably 15 or more, and more preferably 20 or more. The L* values, a* values, and b* values in the hue of the formed body before irradiation are $L_1^*$, $a_1^*$, and $b_1^*$, respectively. In addition, the L* values, a* values, and b* values in the hue of the formed body after irradiation is $L_2^*$, $a_2^*$, and $b_2^*$, respectively. When calculating the photochromic performance (color development performance), in the following equation 1, $\Delta L^*$ is the difference between $L_2^*$ and $L_1^*$ ($\Delta L^* = L_2^* - L_1^*$), $\Delta a^*$ is the difference between $a_2^*$ and $a_1^*$ ($\Delta a^* = a_2^* - a_1^*$), and $\Delta b^*$ is the difference between $b_2^*$ and $b_1^*$ ($\Delta b^* = b_2^* - b_1^*$).

$$\Delta E^*ab = [(\Delta L^*)^2 + (\Delta a^*)^2 + (\Delta b^*)^2]^{1/2} \quad (1)$$

Next, the photochromic performance (discoloring performance) of second substrate 115 containing the photochromic compound will be described. First, a test specimen (not shown) having a thickness of 2.0 mm with a composition equivalent to that of the second substrate 115 containing a photochromic compound is provided. Next, using a handy UV lamp SLUV-6 manufactured by Azone, the above test specimen is irradiated with ultraviolet rays having a wavelength of 365 nm from a position having a height of 155 mm for 10 minutes. Then, the test specimen irradiated with ultraviolet rays is left in a dark place protected from light for 10 minutes, and then the L* value, the a* value, and the b* value in the hues of this test specimen are measured by a color difference meter (CR-200 manufactured by Konica Minolta). The photochromic performance (discoloring performance) of the second substrate 115 containing the photochromic compound has a value ($\Delta E^*ab$) obtained by calculating the amount of change in hue from the above equation 1 based on $L_1^*$ value, $a_1^*$ value, and $b_1^*$ value of the test specimen prior to UV irradiation, and $L_3^*$ value, $a_3^*$ value, and $b_3^*$ value of the test specimen when the test specimen is left to stand for 10 minutes after UV irradiation, which is preferably 5 or more and less than 10, and more preferably less than 5. When calculating the photochromic performance (discoloring performance), in the above equation 1, $\Delta L^*$ is the difference between $L_3^*$ and $L_1^*$ ($\Delta L^* = L_3^* - L_1^*$), $\Delta a^*$ is the difference between $a_3^*$ and $a_1^*$ ($\Delta a^* = a_3^* - a_1^*$), and $\Delta b^*$ is the difference between $b_3^*$ and $b_1^*$ ($\Delta b^* = b_3^* - b_1^*$).

Also, methods of adding the blue selective absorber to second substrate 115 include, for example, coating and kneading. The blue selective absorber has a function of selectively absorbing light in a wavelength range of 380 nm or more and 500 nm or less.

In the case of coating, second substrate 115 has a coating layer containing a blue selective absorber on at least one surface of surface 115a and back surface 115b. Such a coating layer is formed by coating a coating composition on a coating surface and curing the coating composition. The method of curing the coating composition is similar to that of the photochromic compound. The coating process is performed before second substrate 115 is fixed to first substrate 111.

In addition, in the case of kneading, second substrate 115 is formed by kneading a blue selective absorber into a molten base material and pouring it into a mold to solidify it (e.g., by injection molding) Such a kneading process is naturally performed before second substrate 115 is fixed to first substrate 111.

A method of measuring the blue light cut rate of second substrate 115 containing the blue selective absorber will be described. First, a test specimen which is a plano lens having a thickness of 2 mm or a resin flat plate having a thickness of 2 mm is provided. Next, the absorption spectrum of the test specimen is measured using a UV-VIS spectrometer manufactured by Nippon Spectroscopy. Then, the blue light cut rate of the test specimen is calculated. The blue light cut rate is a value obtained by subtracting the average transmittance of the test specimen for light having a wavelength of 380 to 500 nm from 100.

Further, a method of measuring the light transmittance of second substrate 115 containing the blue selective absorber will be described. First, a test specimen which is a plano lens having a thickness of 2 mm or a resin flat plate having a thickness of 2 mm is provided. Next, using a UV-VIS spectrometer manufactured by Nippon Spectroscopy, the absorption spectrum of the test specimen between 800 nm and 250 nm is measured, and the transmission at the respective wavelengths is measured.

The refractive index and the number of Abbe of second substrate 115 containing blue selective absorber are measured at 20° C. using a Pulfrich refractometer KPR-30 manufactured by Shimazu.

Further, a method of adding a rare earth metal compound such as a neodymium compound or an organic dye such as a porphyrin compound to second substrate 115 includes, for example, kneading. In the case of kneading, second substrate 115 is formed by kneading a neodymium compound into a molten base material and pouring it into a mold to solidify it. Such a kneading process is naturally performed before second substrate 115 is fixed to first substrate 111.

As described above, in any additive case, the process of adding the additive to second substrate 115 is preferably performed before second substrate 115 is fixed to first substrate 111.

In the case where an additive as described above is added by kneading, if the thickness dimension of second substrate 115 varies depending on the position, depending on the thickness dimension, color unevenness occurs in the lens 11 when viewed from the front. Specifically, in second substrate 115, the color of the portion having a large thickness dimension becomes darker, and the color of the portion having a small thickness dimension becomes lighter. On the other hand, if the thickness dimension of second substrate 115 is equal throughout, uneven color hardly occurs in the lens 11 when viewed from the front.

Note that the additive is not limited to the above-described additive. Various additives may be selected as the additive which may make the transmittance of second substrate 115 to light in a predetermined wavelength range different from that of first substrate 111.

In addition, in the case where the additive is added to second substrate 115 by the coating layer, the coating layer may have a multilayer structure consisting of a plurality of types of layers. In other words, second substrate 115 may include a plurality of coating layers selected from a coating layer containing a photochromic compound, a coating layer containing a blue selective absorber, and a coating layer containing a neodymium compound.

Adhesive layer 116 is disposed between first substrate 111 and second substrate 115 in normal lens section 11b, and bonds first substrate 111 and second substrate 115. In the case where first electrode 112 and second electrode 114 are also disposed in the normal lens section 11b, adhesive layer 116 is disposed between first electrode 112 and second electrode 114. Adhesive layer 116 also has a function of sealing the liquid crystal material constituting liquid crystal layer 113.

Adhesive layer 116 is constituted of a cured product of an adhesive. The material of the adhesive is not particularly limited if it has translucency and can appropriately bond first substrate 111 and second substrate 115. From the viewpoint of adjusting the optical power of lens 11, an adhesive having a desired refractive index can be selected.

The adhesive constituting adhesive layer 116 is preferably an adhesive which is photocured by irradiating light energy rays such as ultraviolet rays or visible rays. Such an adhesive is effective in preventing deformation or damage of first substrate 111, second substrate 115, and liquid crystal lens section 11a since heat is not applied thereto when the adhesive is cured.

Lens 11 may further include other components having a light-transmitting property accordingly. Examples of the other components include an insulating layer and an alignment film.

The insulating layer prevents conduction between first electrode 112 and second electrode 114. For example, an insulating layer is disposed between first electrode 112 and liquid crystal layer 113, and between liquid crystal layer 113 and second electrode 114, respectively. As a material of the insulating layer, a known material used as an insulating layer having a light-transmitting property can be used. The material of the insulating layer includes silicon dioxide.

The alignment film controls the alignment state of the liquid crystal material in liquid crystal layer 113. For example, the alignment film is disposed between first electrode 112 and liquid crystal layer 113, and between liquid crystal layer 113 and second electrode 114. As a material of the alignment film, a known material used as an alignment film of a liquid crystal material can be used. Examples of the material of the alignment film include polyimide.

<Manufacturing Method of Lens>

Lens 11 is manufactured, for example, by the following manufacturing method. Hereinafter, a manufacturing method of lens 11 according to the present embodiment will be described with reference to FIG. 5.

Figure 5:
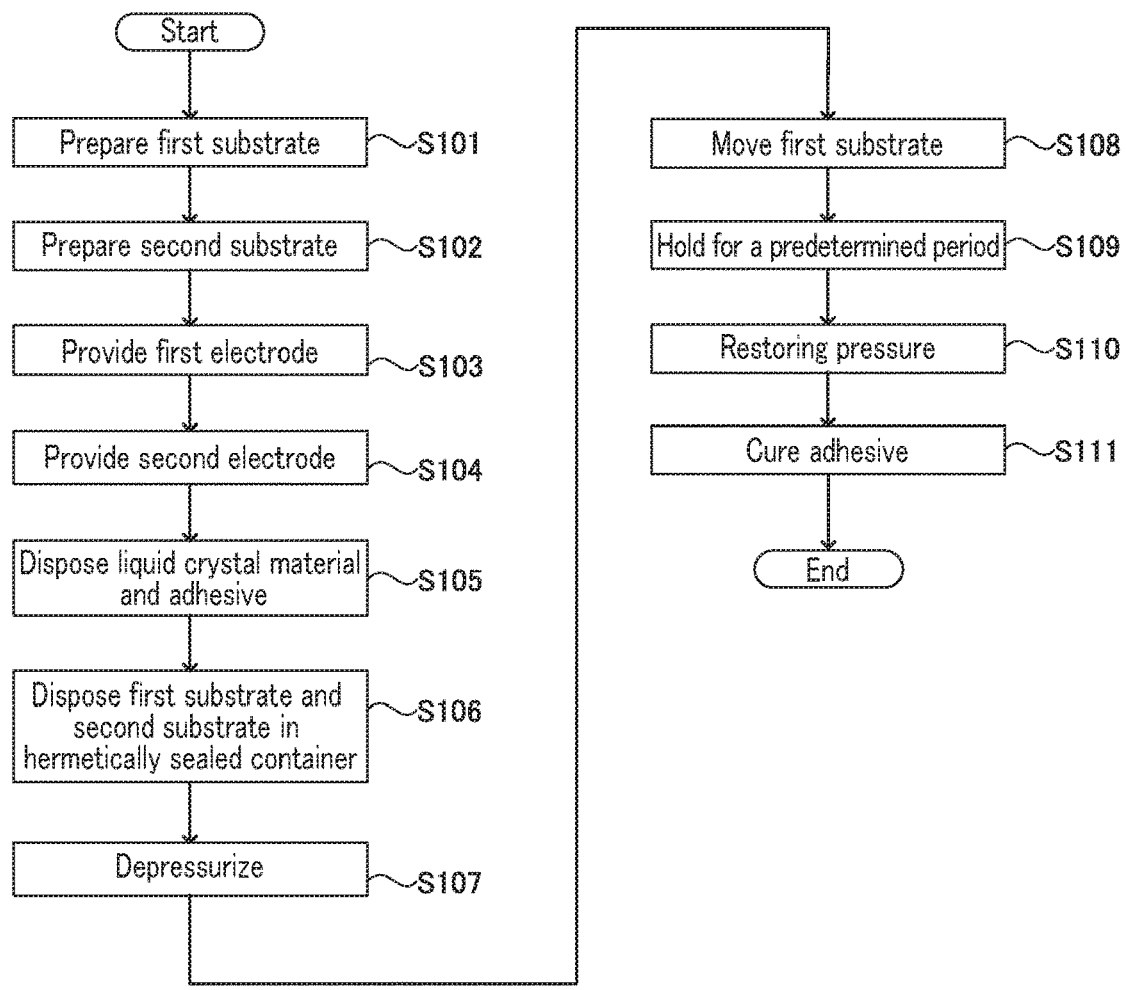
FIG. 5 is a flowchart of a method of manufacturing the lens according to Embodiment 1.

First, in step S101 of FIG. 5, the operator prepares first substrate 111. First substrate 111 is formed by a known method such as injection molding. At this point, the outer shape in a plan view of first substrate 111 is processed into a shape equal to the outer shape in a plan view of lens 11. First substrate 111 is a common component in lens 11 which is incorporated into a frame having the same structure. Therefore, first substrate 111 is manufactured by a common manufacturing method.

Next, in step S102 of FIG. 5, the operator prepares second substrate 115. Such second substrate 115 is also manufactured by a known method such as injection molding. Second substrate 115 is a non-common component which can be selected depending on the desired optical characteristics in lens 11 to be incorporated into a frame having the same structure. That is, for second substrate 115, a plurality of types of second substrates 115 having transmittances different from those of first substrate 111 with respect to light in a predetermined wavelength range are manufactured.

In the case where the method of adding the additive is coating or dyeing, the intermediate lens produced by injection molding is presented to coating treatment or dyeing. In addition, in the case where the method of adding the additive is kneading, an additive is added to the molten base material used in injection molding before injection molding.

The operator then selects second substrate 115 having the desired optical characteristics from among a plurality of types of second substrate 115 having different optical characteristics, such as photochromic lenses, blue light cut lenses, and neo-contrast lenses.

Next, in step S103 of FIG. 5, the operator provides first electrode 112 on first substrate 111.

Next, in step S104 of FIG. 5, the operator provides second electrode 114 on second substrate 115. Note that as examples of a method of providing first electrode 112 on first substrate 111 and a method of providing second electrode 114 on second substrate 115, a vacuum evaporation method and a sputtering method can be cited. Such methods are preferably performed at a temperature equal to or lower than the glass transition point "Tg" of the member (that is, first substrate 111 and second substrate 115) for providing the electrode.

Figure 5A:
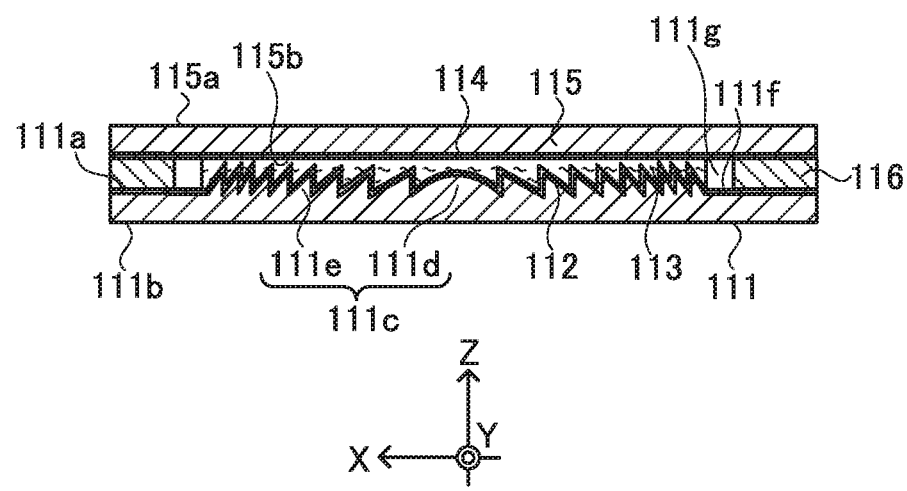
FIG. 5A is a cross-sectional view of the intermediate assembly for explaining the process of step S110 shown in FIG. 5.

Then, in step S105 of FIG. 5, the operator disposes the liquid crystal material on diffraction region 111c of first substrate 111 where first electrode 112 is provided, as well as the adhesive disposes on the section other than diffraction region 111c in surface 111a of first substrate 111 and circular spare region 111f present around diffraction region 111c (refer to FIG. 5A).

Spare region 111f is not coated with an adhesive in step S105. Spare region 111f is formed by considering the application patterns and application amounts of the adhesive, the thickness of the final adhesive layer, the size and shape of diffractive region 111c, the degree of depressurization (step S107 to be described later), and the like.

The adhesive consists of a plurality of adhesive elements. The adhesive elements are each in the form of balls and are supplied to surface 111a of first substrate 111 by a jet dispenser (not shown). Adjacent adhesive elements do not contact each other.

Next, in step S106 of FIG. 5, the operator disposes first substrate 111 on which the liquid crystal materials and the adhesives are arranged in the inner space of the hermetically sealed container (not shown). First substrate 111 is fixed to the hermetically sealed container by a fixing member (not shown).

In step S106 of FIG. 5, the operator disposes second substrate 115 provided with second electrodes 114 in the inner space of the hermetically sealed container. Second substrate 115 is fixed to the hermetically sealed container by a fixing member (not shown). Second substrate 115 faces first substrate 111 with a predetermined gap therebetween.

Next, in step S107 of FIG. 5, the pressure of the inner space in which first substrate 111 and second substrate 115 are disposed is depressurized by a vacuum pump to a pressure lower than the atmospheric pressure. The process in step S107 of FIG. 5 is referred to as a depressurization process.

Next, in step S108 of FIG. 5, first substrate 111 is moved closer to second substrate 115. The means for moving first substrate 111 may be manual or automatic. In step S108, second substrate 115 may be moved close to first substrate 111.

In step S108, when surface 111a of first substrate 111 comes into contact with back surface 115b of second substrate 115, the fixing of second substrate 115 is released. Then, back surface 115b of second substrate 115 is pressed against surface 111a of first substrate 111 by the weight of second substrate 115. In this manner, first substrate 111 and second substrate 115 are bonded to each other. The process of step S108 of FIG. 5 is referred to as a bonding process.

Next, in step S109 of FIG. 5, first substrate 111 and second substrate 115 are held in a state of being bonded to each other for a predetermined period. Then, the adhesive elements disposed adjacent to each other between first substrate 111 and second substrate 115 are pressed by second substrate 115 and connected. As a result, the adhesive is disposed so as to surround diffraction region 111c.

In this state, spare space 111g is formed between spare region 111f of first substrate 111 and back surface 115b of second substrate 115 (refer to FIG. 5A). Spare space 111g and diffraction region 111c are separated from the external space by an adhesive. The process in step S109 of FIG. 5 is referred to as a standby process. In the present embodiment, since the distance between the outer peripheral edge of spare region 111f and the outer peripheral edge of diffraction region 111c is larger than the application interval between the adhesive elements in the vicinity of the outer peripheral edge of spare region 111f, spare space 111g is easily formed.

Next, in step S110 of FIG. 5, the atmospheric pressure in the hermetically sealed container is restored to the atmospheric pressure. At this time, since spare space 111g around diffraction region 111c is surrounded by the adhesive, the adhesive is drawn toward spare space 111g. In addition, since the adhesive has viscosity, if the flowing-in speed does not keep up with the restoring speed of the pressure, the inside of spare space 111g becomes negative pressure.

Since spare space 111g has a negative pressure, second substrate 115 is pressed against first substrate 111 by atmospheric pressure. As a result, the liquid crystal material spreads over the entire diffraction region 111c. Further, the adhesive spreads over the entire convex curved surface of first substrate 111 except for diffraction region 111c, and as shown in FIG. 3, spare space 111g almost disappears. The process in step S110 of FIG. 5 is referred to as a restoring pressure process.

Here, the application amount of the liquid crystal material is determined such that the liquid crystal material is held on diffraction region 111c by the surface tension of second substrate 115 at the stage of the restoring pressure process. Therefore, only the adhesive is drawn into spare space 111g, and the liquid crystal material is not drawn. In other words, since the adhesive and the liquid crystal material do not mix with each other, the adhesive strength in the adhesive layer can be increased.

Finally, in step S111 of FIG. 5, the operator cures the adhesive. Through the above processes, lens 11 is manufactured. Note that the method of curing the adhesive is as described above. In the case where second substrate 115 is a photochromic lens, light is irradiated from the rear side of first substrate 111 to cure the adhesive. This is since when irradiating light from the front side, i.e., the front side of second substrate 115, second substrate 115 which is a photochromic lens absorbs light, such that the adhesive does not cure.

If the curing method of the adhesive is a photocuring method, in step S111 described above, heat at a temperature higher than the glass transition point "Tg" of first substrate 111 and second substrate 115 is not applied to the constituent member of lens 11. The process performed in steps S106 to S111 of FIG. 5 as described above is referred to as a vacuum-bonding.

Note that the adhesive may be disposed on a section of second substrate 115 facing a section other than diffraction region 111c of first substrate 111. It should be noted that the order of steps S101 to S111 described above may be appropriately interchanged within a scope not inconsistent in the art. Also, within a scope not inconsistent in the art, steps S101 to S111 described above may be performed in parallel. In addition, the subject of carrying out the manufacturing method described above is not limited to a person, and may be a machine. Further, if required, after step S111 of FIG. 5, at least one of the surface and the back surface of lenses 11 may be subjected to a post-processing such as coating processing, cutting processing, grinding processing, or polishing processing.

Functions and Effects of the Present Embodiment

According to the present embodiment having the above-described configuration, by changing the additive possessed by second substrate 115, it is possible to provide lens 11 having optical characteristics corresponding to the usage of the user.

Further, in the case of imparting special optical characteristics to the lens obtained by bonding the first substrate and the second substrate, since the process of imparting optical characteristics (e.g., a coating step) is required after the bonding process, there is a possibility that the production efficiency is reduced. On the other hand, in the case of the present embodiment, in a state before bonding first substrate 111 and second substrate 115, a plurality of types of second substrate 115 having special optical characteristics and first substrate 111 which is a common component can be prepared. Then, second substrate 115 having the desired optical characteristics is selected from a plurality of types of second substrate 115, and bonded to first substrate 111. That is, in the present embodiment, the process of imparting the optical characteristics to second substrate 115 is not performed after the bonding process. The configuration of such an embodiment is effective in improving the production efficiency (i.e., shortening the manufacturing time), as compared with the case of imparting special optical characteristics to the bonded lens.

In the case of the present embodiment, the thickness dimensions of second substrate 115 are equal throughout. Therefore, even in the case where the additive is added by kneading, color unevenness hardly occurs in second substrate 115. Therefore, color unevenness hardly occurs in lens 11 when viewed from the front.

Further, in the case of the present embodiment, the process of adding an additive to second substrate 115 is performed before second substrate 115 is fixed to first substrate 111. Therefore, even in the case where heat is applied to second substrate 115 in the process of adding an additive, heat is not applied to first substrate 111 and liquid crystal layer 113. Such a configuration of the present embodiment is effective in preventing deformation or damage of first substrate 111 and liquid crystal layer 113.

Embodiment 2

Figure 6:
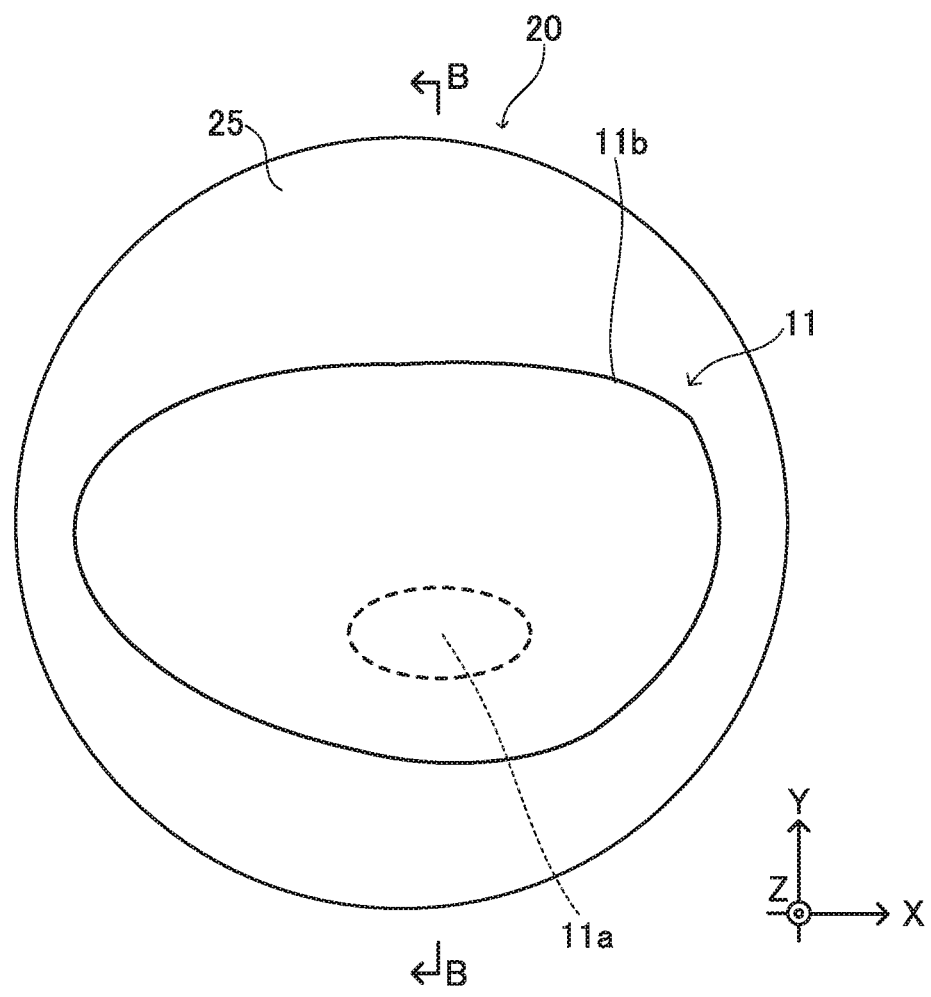
FIG. 6 is a front view of the semi-finished lens according to Embodiment 2 of the present invention.
Figure 7:
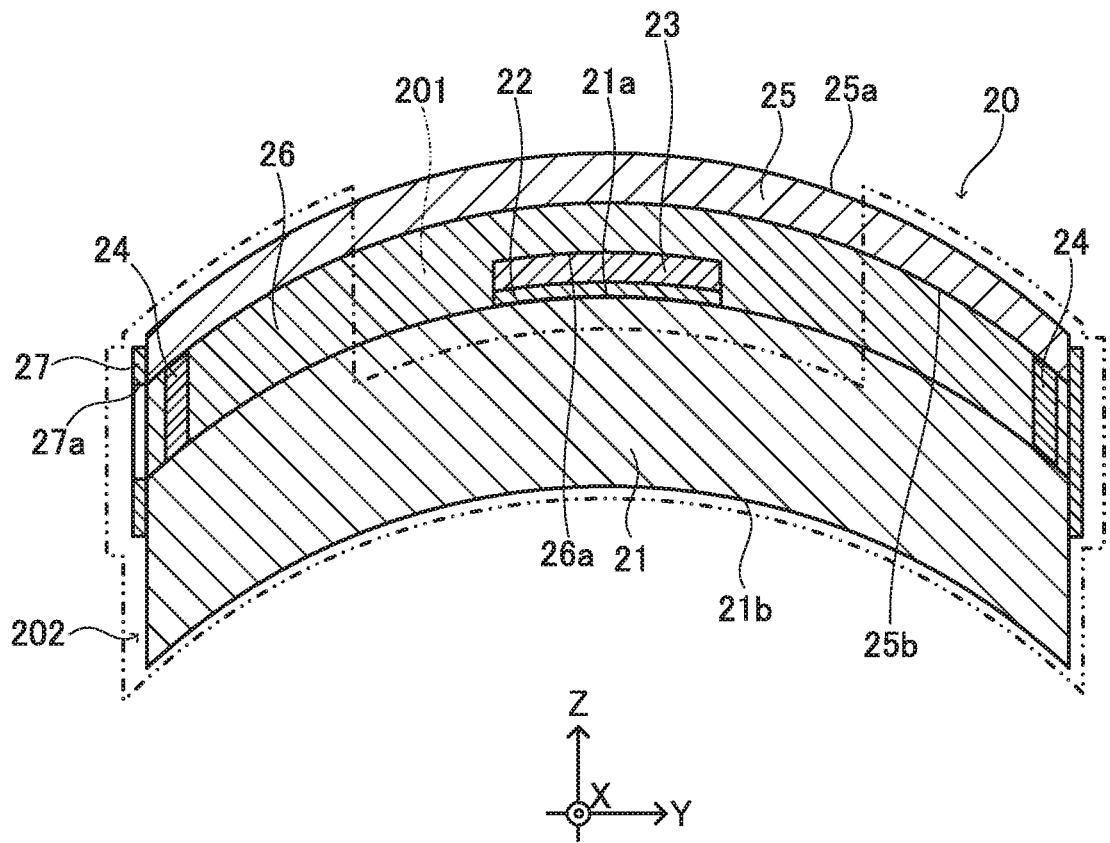
FIG. 7 is a B-B line cross-sectional view of FIG. 6.

With reference to FIGS. 6 to 10, semi-finished lens 20 according to Embodiment 2 of the present invention will be described. FIG. 6 is a front view of semi-finished lens 20. FIG. 7 is a B-B line cross-sectional view of FIG. 6.

Semi-finished lens 20 is processed into lens 11 of Embodiment 1 described above by post-processing. Such semi-finished lens 20 is also an object of the present invention.

Semi-finished lens 20 includes first intermediate substrate 21, first adhesive layer 22, film element 23, spacer member 24, second intermediate substrate 25, second intermediate adhesive layer 26, and fixing member 27.

<First Intermediate Substrate>

First intermediate substrate 21 (also referred to as first substrate) will be described with reference to FIG. 7. First intermediate substrate 21 is an optical element formed of a transparent plate-like member having surface 21a and back surface 21b. Specifically, first intermediate substrate 21 is disk-shaped curved convexly toward the plus side in Z direction. Surface 21a of first intermediate substrate 21 is a convex curved surface which is curved convexly toward the plus side in Z direction. Back surface 21b of first intermediate substrate 21 is a concave curved surface which is curved concavely toward the plus side in Z direction.

Surface 21a is finished to an optical surface by finishing processing. On the other hand, back surface 21b is an unfinished surface which has not been subjected to finishing processing. Such back surface 21b is finished to an optical surface by post-processing.

In the present embodiment, surface 21a is a spherical surface having a single curvature. Back surface 21b is also a spherical surface having a single curvature. Back surface 21b is processed into a shape, for example, corresponding to the vision of the user by post-processing.

At least one of surface 21a and back surface 21b may be a compound curved surface having a plurality of curvatures. At least one of surface 21a and back surface 21b may be a flat surface.

The material of first intermediate substrate 21 is the same as the material of first substrate 111 of Embodiment 1 described above.

<First Adhesive Layer>

With reference to FIG. 7, first adhesive layer 22 will be described. First adhesive layer 22 is disposed between surface 21a of first intermediate substrate 21 and the back surface of film element 23, and fixes film element 23 and first intermediate substrate 21. Such first adhesive layer 22 is a sheet-like member having an outer shape substantially the same as that of film element 23 described later. First adhesive layer 22 is curved convexly toward the plus side in Z direction, in a state of being fixed to first intermediate substrate 21.

First adhesive layer 22 is constituted of, for example, a film-like adhesive made of an optical pressure-sensitive adhesive, a thermosetting adhesive, or an ultraviolet curable adhesive.

<Film Element>

The structure of film element 23 will be described with reference to FIG. 7. Film element 23 (also referred to as an electrical element) is a film-like optical element with optical characteristics changed by electrical control. Such film element 23 is fixed to surface 21a of first intermediate substrate 21 via first adhesive layer 22. Film element 23, along surface 21a of first intermediate substrate 21, curved convexly toward the plus side in Z direction, in a state of being fixed to first intermediate substrate 21.

Although not shown, film element 23 has a laminated structure in which an inner first electrode, a liquid crystal layer, and an inner second electrode are arranged in this order from the first film side between the first film member and the second film member. The inner first electrode and the inner second electrode correspond to first electrode 112 and second electrode 114 of Embodiment 1 described above. The liquid crystal layer corresponds to liquid crystal layer 113 of Embodiment 1. The first film member and the second film member are fixed to each other at their peripheral edges by an adhesive layer. The adhesive layer has a function of fixing the first film member and the second film member, and sealing the liquid crystal material constituting the liquid crystal layer. As such film element 23, a known film element can be employed, and a detailed description thereof will be omitted. Instead of film element 23, as an electric element, a configuration of liquid crystal lens section 11a of Embodiment 1 described above may be employed.

<Spacer Member>

Spacer member 24 will be described with reference to FIG. 7. Spacer member 24 is provided between first intermediate substrate 21 and second intermediate substrate 25 to prevent first intermediate substrate 21 and second intermediate substrate 25 from approaching each other less than the thickness dimension of spacer member 24.

Such spacer member 24 is disposed at a plurality of positions (in the case of the present embodiment, three positions) of the outer peripheral edge in surface 21a of first intermediate substrate 21. Each spacer members 24 are preferably disposed at equal intervals (for example, 120 degrees), in the direction along the outer peripheral edge of first intermediate substrate 21.

In the present embodiment, spacer member 24 is a columnar member and has a predetermined thickness dimension. One end (the plus side in Z direction) of spacer member 24 is fixed to back surface 25b of second intermediate substrate 25 by, for example, an adhesive. The other end (the minus side in Z direction) of spacer member 24 is fixed to surface 21a of first intermediate substrate 21 by, for example, an adhesive.

Figure 8A:
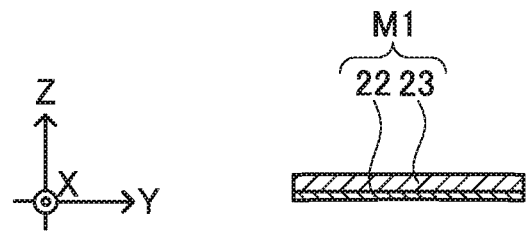
FIG. 8A is a cross-sectional view for explaining the first process in the manufacturing process of the semi-finished lens.
Figure 8B:
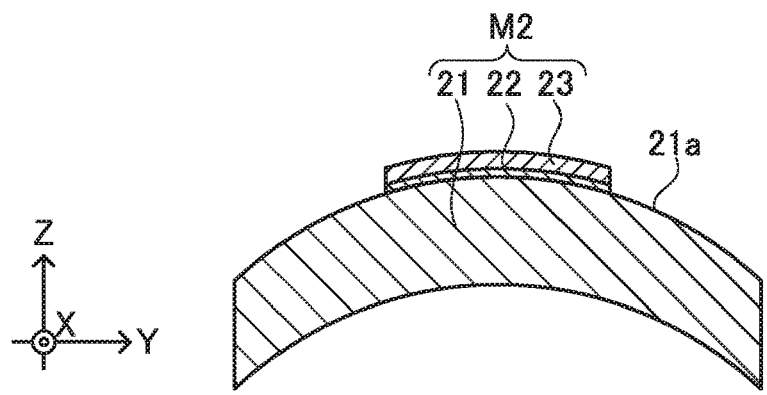
FIG. 8B is a cross-sectional view for explaining the second process in the manufacturing process of the semi-finished lens.
Figure 8C:
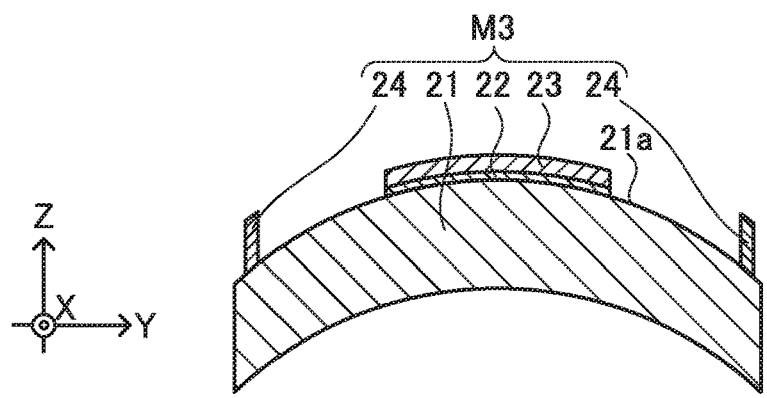
FIG. 8C is a cross-sectional view for explaining the third process in the manufacturing process of the semi-finished lens.
Figure 8D:
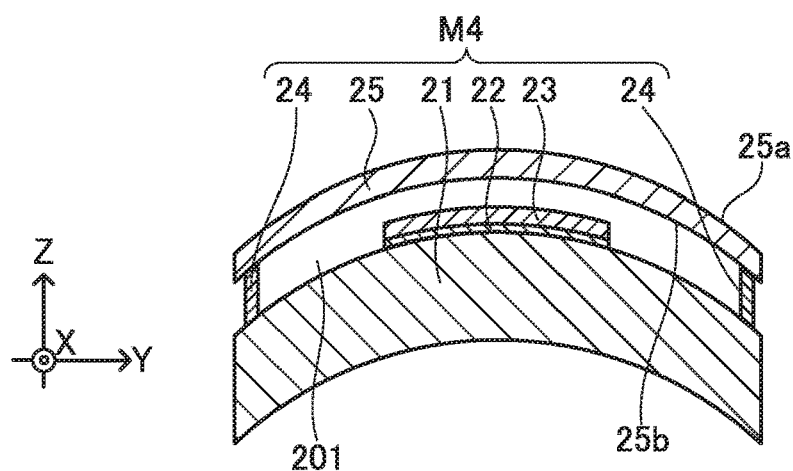
FIG. 8D is a cross-sectional view for explaining the fourth process in the manufacturing process of the semi-finished lens.

By disposing spacer member 24 between first intermediate substrate 21 and second intermediate substrate 25, space 201 for disposing second intermediate adhesive layer 26 is formed between first intermediate substrate 21 and second intermediate substrate 25 (refer to FIG. 8D).

The thickness dimension of space 201 is equal to that of spacer member 24. The thickness dimension of space 201 is larger than that of film element 23. Spacer member 24 as described above is removed in the post-processing (specifically, the outer periphery processing).

The spacer member may have a partial cylindrical shape having a discontinuous portion at one position in the circumferential direction. The discontinuous portion is a supply port for supplying the curable composition constituting second intermediate adhesive layer 26 to be described later to space 201.

The spacer member may have a cylindrical shape continuous over the entire circumference. Such cylindrical spacer member, at least one position in the circumferential direction, has a through hole or a notch penetrating from the inner peripheral surface to the outer peripheral surface. The through hole and the notch are supply ports for supplying the curable composition constituting second intermediate adhesive layer 26 to space 201.

<Second Intermediate Substrate>

Second intermediate substrate 25 (also referred to as a second substrate) will be described with reference to FIG. 7. Second intermediate substrate 25 is disposed on the plus side in Z direction with respect to film element 23, and covers film element 23 with second intermediate adhesive layer 26.

Such second intermediate substrate 25 is an optical element formed of a transparent plate-like member. Specifically, second intermediate substrate 25 is disk-shaped curved convexly toward the plus side in Z direction. Surface 25a of second intermediate substrate 25 is a convex curved surface which is curved convexly toward the plus side in Z direction. Back surface 25b of second intermediate substrate 25 is a concave curved surface which is curved concavely toward the plus side in Z direction.

Surface 25a and back surface 25b are finished to the optical surface by finishing process. In the present embodiment, surface 25a is a spherical surface having a single curvature. Back surface 25b is also a spherical surface having a single curvature. The curvature of surface 25a and the curvature of back surface 25b have a relationship such that the distance between surface 25a and back surface 25b is constant throughout.

At least one of surface 25a and back surface 25b may be a compound curved surface having a plurality of curvatures. At least one of surface 25a and back surface 25b may be a flat surface.

The material of second intermediate substrate 25 is the same as the material of second substrate 115 of Embodiment 1 described above. That is, also in the present embodiment, second intermediate substrate 25 has a transmittance for light in a predetermined wavelength range different from that of first intermediate substrate 21.

<Second Intermediate Adhesive Layer>

With reference to FIG. 7, second intermediate adhesive layer 26 will be described. Second intermediate adhesive layer 26 is disposed in space 201 between first intermediate substrate 21 and second intermediate substrate 25 to fix first intermediate substrate 21 and second intermediate substrate 25 and protects film element 23 from impact.

Such second intermediate adhesive layer 26 is an optical element formed of a transparent plate-like member. Specifically, second intermediate adhesive layer 26 is disk-shaped curved convexly toward the plus side in Z direction. The surface of second intermediate adhesive layer 26 is a convex curved surface which is curved convexly toward the plus side in Z direction. The back surface of second intermediate adhesive layer 26 is a concave curved surface which is curved concavely toward the plus side in Z direction. Second intermediate adhesive layer 26 has recess 26a on the back surface for disposing film element 23.

Second intermediate adhesive layer 26 as described above is formed by injecting a curable composition into space 201 through communication section 27a of fixing member 27 described later and curing it. As an example of the curable composition constituting second intermediate adhesive layer 26, various optical adhesives are cited. In particular, as an example of the curable composition constituting second intermediate adhesive layer 26, a photocuring adhesive which is photocured by irradiation with light energy rays such as ultraviolet rays or visible rays is preferred. Note that, as an example of the curable composition constituting second intermediate adhesive layer 26, a thermosetting adhesive which is thermally cured by applying heat energy is also cited. Preferably, each of such adhesives has a low viscosity.

<Fixing Member>

Fixing member 27 has, for example, a tape shape, and is wound around the outer peripheral surface of first intermediate substrate 21 and the outer peripheral surface of second intermediate substrate 25 so as to surround space 201. Fixing member 27 also has a function of fixing first intermediate substrate 21 and second intermediate substrate 25. Such fixing member 27 has communication section 27a which communicates space 201 with the external space at least at one position in the circumferential direction.

<Manufacturing Method of Semi-Finished Lenses>

Next, with reference to FIGS. 8A to 8F and FIG. 10, a manufacturing method of semi-finished lens 20 will be described.

Figure 10:
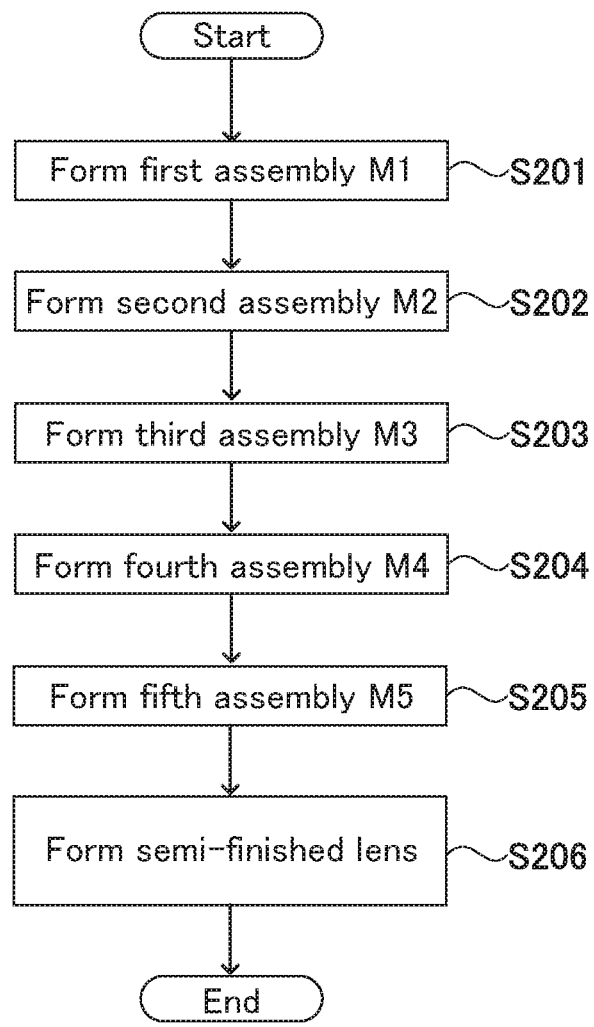
FIG. 10 is a flowchart of a method of manufacturing the semi-finished lens according to Embodiment 2.

First, in step S201 of FIG. 10, the operator pastes the surface of first adhesive layer 22 of the film-like on the back surface of film element 23 to form first assembly M1 (refer to FIG. 8A). In first assembly M1, film element 23 and first adhesive layer 22 are not curved.

Next, in step S202 of FIG. 10, the operator pastes the back surface of first adhesive layer 22 in first assembly M1 on surface 21a of first intermediate substrate 21 to form second assembly M2 (refer to FIG. 8B).

First intermediate substrate 21 is formed by a known method such as injection molding. At this point, the outer shape in the plan view of first intermediate substrate 21 is a shape such as to include an outer shape in the plan view of lens 11. That is, the outer shape in the plan view of first intermediate substrate 21 is larger than the outer shape in the plan view of lens 11. First intermediate substrate 21 is a common component common to semi-finished lens 20 of the same size. Therefore, first intermediate substrate 21 is formed by a common manufacturing method.

The process of pasting first assembly M1 on surface 21a of first intermediate substrate 21 is performed using a jig (not shown). The jig has a holding surface capable of holding first assembly M1. The holding surface elastically deforms along surface 21a when being pressed against surface 21a. When the holding surface holding film element 23 is pressed against surface 21a, film element 23 is pasted to surface 21a while being deformed along surface 21a.

Next, in step S203 of FIG. 10, the operator disposes a plurality of spacer members 24 around the section where film element 23 is fixed in surface 21a of first intermediate substrate 21 to form third assembly M3 (refer to FIG. 8C). In third assembly M3, the other end (the minus side in Z direction) of each spacer member 24 is fixed to surface 21a of first intermediate substrate 21 by, for example, an adhesive.

Next, in step S204 of FIG. 10, the operator disposes second intermediate substrate 25 on the plus side in Z direction of first intermediate substrate 21 to form fourth assembly M4 (refer to FIG. 8D). In fourth assembly M4, one end (the positive side in Z direction) of each spacer member 24 is fixed to back surface 25b of second intermediate substrate 25 by, for example, an adhesive. In fourth assembly M4, space 201 exists between first intermediate substrate 21 and second intermediate substrate 25.

Such second intermediate substrate 25 is manufactured by a known method such as injection molding. Second intermediate substrate 25 is a non-common component which can be selected depending on the desired optical characteristics in the same sized semi-finished lens 20. That is, for second intermediate substrate 25, a plurality of types of second intermediate substrates 25 each having a transmittance for light in a predetermined wavelength range different from that of first intermediate substrate 21 are manufactured. The operator, from among them, selects second intermediate substrate 25 depending on the desired optical characteristics.

In the case where the method of adding the additive is coating or dyeing, the intermediate lens produced by injection molding is subjected to coating treatment or dyeing. In addition, in the case where the method of adding the additive is kneading, an additive is added to the molten base material used in injection molding before injection molding.

Then, the operator selects second intermediate substrate 25 having the desired optical characteristics from among a plurality of types of second intermediate substrate 25 having different optical characteristics, such as a photochromic lens, a blue light cut lens, and a neo-contrast lens.

Figure 8E:
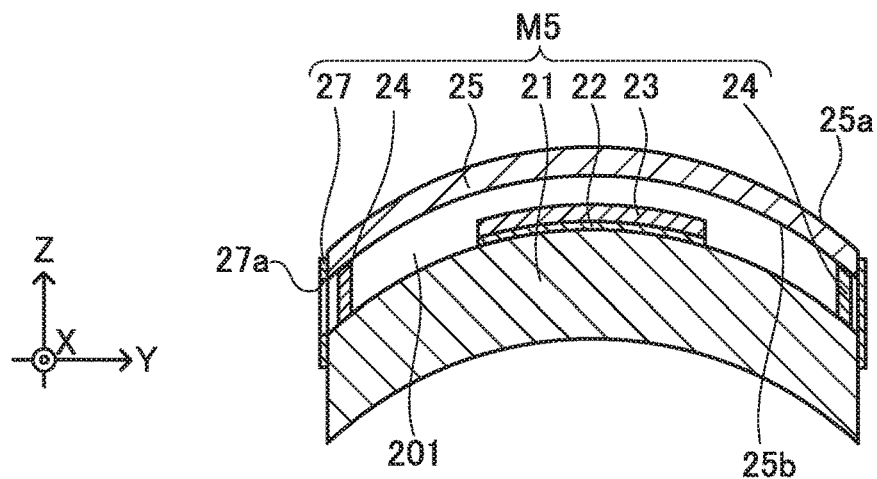
FIG. 8E is a cross-sectional view for explaining the fifth process in the manufacturing process of the semi-finished lens.

Next, in step S205 of FIG. 10, the operator, so as to surround space 201, winds fixing member 27 on the outer peripheral surface of first intermediate substrate 21 and the outer peripheral surface of second intermediate substrate 25 to form fifth assembly M5 (refer to FIG. 8E). In fifth assembly M5, space 201 is closed by a section other than communication section 27a of fixing member 27. In other words, space 201 communicates with the external space only through communication section 27a.

Figure 8F:
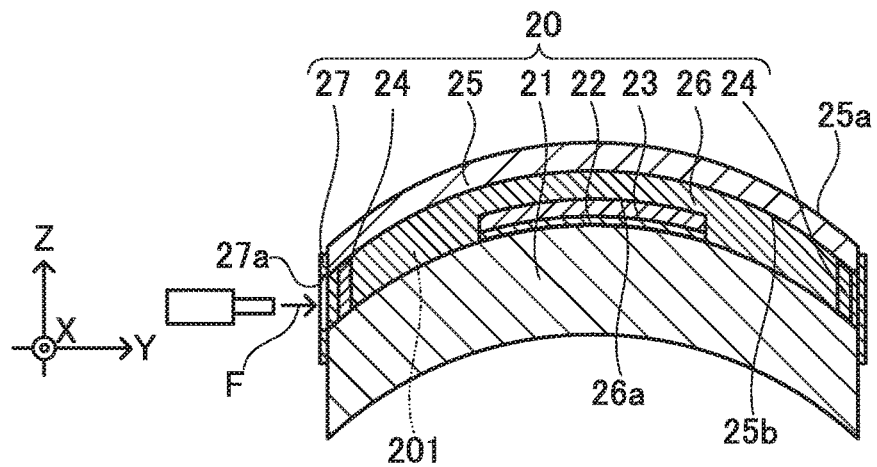
FIG. 8F is a cross-sectional view for explaining the sixth process in the manufacturing process of the semi-finished lens.

Finally, in step S206 of FIG. 10, as indicated by the arrow F in the FIG. 8F, the operator supplies the curable composition constituting second intermediate adhesive layer 26 to space 201 through communication section 27a of fixing member 27. Then, the operator cures the curable composition in space 201 to form semi-finished lens 20 (see FIG. 7). It should be noted that the order of steps S201 to S206 described above may be appropriately interchanged within a scope not inconsistent in the art. Also, within a scope not inconsistent in the art, steps S201 to S206 described above may be performed in parallel. In addition, the subject of carrying out the manufacturing method described above is not limited to a person, and may be a machine.

Each process referred to FIGS. 8A to 8F above does not include the process of applying heat. Such a method of manufacturing the semi-finished lens is effective in preventing deformation or damage of first intermediate substrate 21, second intermediate substrate 25, and film element 23.

Figure 9:
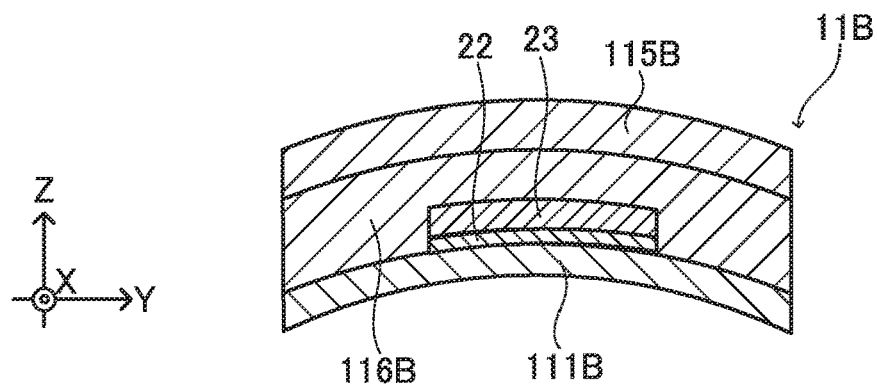
FIG. 9 is a cross-sectional view of the lens according to Embodiment 2.

Semi-finished lens 20 obtained by the above-described manufacturing method is post-processed, whereby semi-finished lens 20 is processed into lens 11B (refer to FIG. 9). Although a detailed description of post-processing is omitted, semi-finished lens 20 is processed into lens 11 by removing removal section 202 (a section surrounded by a two-dot chain line in FIG. 7) in post-processing.

Specifically, first intermediate substrate 21 of semi-finished lens 20 turns into first substrate 111B of lens 11B after being subjected to post-processing. Second intermediate substrate 25 of semi-finished lens 20 turns into second substrate 115B of lens 11B after being subjected to post-processing. Second intermediate adhesive layer 26 of semi-finished lens 20 turns into adhesive layer 116B of lens 11B. Spacer member 24 and fixing member 27 of semi-finished lens 20 are removed by post-processing.

The post-processing includes the back surface processing for cutting the back surface of semi-finished lens 20 by grinding, and the outer peripheral processing for cutting the outer periphery of semi-finished lens 20 by cutting and polishing.

Further, for example, a coating process for forming a coating layer may be performed on the back surface (the back surface of second intermediate substrate 25) of semi-finished lens 20 after the back surface processing. In addition, a coating process for forming a coating layer may be performed on the surface of semi-finished lens 20 (surface 21a of first intermediate substrate 21) at an appropriate timing.

The coating layer includes, for example, at least one layer of a primer layer, a hard coat layer, an antireflection film layer, an antifogging coat layer, an antifouling layer, and a water repellent layer. The coating layer may have a multilayer structure consisting of a plurality of types of layers. However, the coating layer of the surface side may be a single layer structure comprising one kind of layer. It is preferred that the coating process for forming such a coating layer is a process which does not add heat to semi-finished lens 20.

Functions and Effects of the Present Embodiment

According to the present embodiment as described above, it is possible to provide a lens having optical characteristics according to an application at low cost. The reasons for this will be described below.

The material of second intermediate substrate 25 containing additives to impart special optical characteristics is more expensive than the material of first intermediate substrate 21 not containing additives. In the case of the present embodiment, as shown in FIGS. 6 and 7, the volume of second intermediate substrate 25 occupying semi-finished lens 20 is smaller than that of first intermediate substrate 21. That is, the amount of the material of second intermediate substrate 25 used for semi-finished lens 20 is less than that of first intermediate substrate 21. Therefore, the configuration of the present embodiment can reduce the cost of semi-finished lens 20 and lens 11 as compared with the configuration in which the additive is added to first intermediate substrate 21.

The ratio of second intermediate substrate 25 to removal section 202 (the section surrounded by the two-dot chain line in FIG. 7) removed from semi-finished lens 20 in the post-processing described above is smaller than that of first intermediate substrate 21. That is, the amount of second intermediate substrate 25 removed by post-processing is smaller than that of first intermediate substrate 21. Therefore, in the configuration of the present embodiment, as compared with a configuration in which an additive is added to a material of first intermediate substrate 21, a yield related to a material containing an additive can be increased. From this viewpoint also, the configuration of the present embodiment is advantageous for lowering the cost of semi-finished lens 20 and lens 11.

In addition, in the case of the present embodiment, the process of adding an additive to second intermediate substrate 25 is performed before second intermediate substrate 25 is fixed to first intermediate substrate 21. Therefore, in the process of adding an additive, even in the case where heat is applied to second intermediate substrate 25, heat is not applied to first intermediate substrate 21 and film element 23 Further, if a photocuring adhesive is employed as second intermediate adhesive layer 26, no heat is applied to first intermediate substrate 21 and film element 23 even in the process of fixing second intermediate substrate 25 and first intermediate substrate 21. Such a manufacturing method is effective in preventing deformation or damage of first intermediate substrate 21 and film element 23.

ADDITIONAL REMARKS

While embodiments of the present invention have been described above, the present invention is not limited to the above-described embodiments, and various changes can be made without departing from the spirit of the present invention. For example, in Embodiment 2, film element 23 may be fixed to second intermediate substrate 25. In this case, second intermediate substrate 25 is the first substrate, and first intermediate substrate 21 is the second substrate.

Further, eyewear to which a lens according to the present invention can be applied includes eyeglasses (including electronic glasses and sunglasses) and goggles having an auxiliary mechanism for improving visual acuity of a user like a visual acuity correction lens. The eyewear to which the lens according to the present invention can be applied includes various devices (e.g., a glasses-type wearable terminal, a head mount display, and the like) having a mechanism for presenting information to a user's field of view or eyes.

The eyewear to which the lens according to the present invention can be applied may be configured to hold an auxiliary mechanism for improving visual acuity or vision, a mechanism for presenting information, or the like in front of or around the user's eyes. The eyewear to which the lens according to the present invention can be applied is not limited to a glasses type which is hung on both ears, but may be a type which is worn on the head, one ear, or the like. Further, the eyewear to which the lens according to the present invention can be applied is not limited to an eyewear for both eyes, and may be an eyewear for one eye.

The disclosures of the specification, drawings, and abstract contained in Japanese Patent Application No. 2018-022153, filed Feb. 9, 2018, are hereby incorporated by reference in their entirety.

INDUSTRIAL APPLICABILITY

The lens according to the present invention is not limited to a lens for eyeglasses, and can be applied to a lens for various eyewear.

REFERENCE SIGNS LIST

100 Electronic glasses
10 Frame
101 Front
102 Temple
11, 11B Lens
11a Liquid crystal lens section
111, 111B First substrate
111a Surface
111b Back surface
111c Diffraction region
111d Convex section
111e First convex streak
111f Spare region
111g Spare space
112 First electrode
113 Liquid crystal layer
114 Second electrode
115, 115B Second substrate
115a Surface
115b Back surface
116, 116B Adhesive layer
11b Normal lens section
13 Control section
14 Detection section
15 Power source
20 Semi-finished lens
21 First intermediate substrate
21a Surface
21b Back surface
22 First adhesive layer
23 Film element
24 Spacer member
25 Second intermediate substrate
25a Surface
25b Back surface
26 Second intermediate adhesive layer
26a Recess
27 Fixing member
27a Communication section
201 Space
202 Removal section
M1 First assembly
M2 Second assembly
M3 Third assembly
M4 Fourth assembly
M5 Fifth assembly

What is claimed is:
1. A lens for an eyewear, comprising:
a power source;
a detection section operated by a user of the eyewear;
a first substrate having a main surface, the first substrate being transparent;
a second substrate disposed opposite to the main surface and having a transmittance with respect to a light in a predetermined wavelength range, the transmittance being different from that of the first substrate;
an electrical element provided between the first substrate and the second substrate, including a liquid crystal layer, and having a refractive index which is changed by electrical control;
an adhesive layer provided between the first substrate and the second substrate; and
a control section changing the refractive index of the electrical element by applying a voltage of the power source when the detection section is operated by the user,
wherein:
the first substrate has a different thickness dimension in a direction of an optical axis of the lens depending on a position, and
the second substrate has the same thickness dimension in the direction of the optical axis throughout, is arranged farther from the user of the eyewear than the first substrate when the user wears the eyewear, and is kneaded an additive that is not included in the first substrate and makes the transmittance different from a transmittance of the first substrate.

2. The lens according to claim 1, wherein
the additive includes a photochromic compound.

3. The lens according to claim 2, wherein
in a case where a state in which the second substrate does not develop color is a normal state and a state in which the second substrate develops color by irradiating the second substrate with ultraviolet rays having a wavelength of 365 nm from a position of 155 mm in height for 10 minutes is a colored state,
the transmittance of the second substrate with respect to a light having a wavelength of 380 nm is 8% or less in the colored state,
an amount of change in hue $\Delta E^*ab$ calculated from the following equation (A) based on $L_1^*$, $a_1^*$ and $b_1^*$ of the second substrate in the normal state and $L_2^*$, $a_2^*$ and $b_2^*$ of the second substrate in the colored state is 15 or more, and
an amount of change in hue $\Delta E^*ab$ calculated from the following equation (A) based on $L_1^*$, $a_1^*$ and $b_1^*$ of the second substrate in the normal state and $L_3^*$, $a_3^*$ and $b_3^*$ of the second substrate after the second substrate in the colored state is left in a dark place for 10 minutes is less than 10%

$$\Delta E^*ab=[(\Delta L^*)^2+(\Delta a^*)^2+(\Delta b^*)^2]^{1/2} \quad \text{(Equation A)}.$$

4. The lens according to claim 1, wherein
the additive includes a selective absorber which selectively absorbs light in a wavelength range of 380 nm or more and 500 nm or less.

5. The lens according to claim 4, wherein:
the selective absorber includes a benzotriazole-based selective absorber which absorbs ultraviolet rays, and
a light cut rate of the second substrate with respect to a light having a wavelength of 400 nm is 99.8% or more.

6. The lens according to claim 4, wherein:
the selective absorber includes an ultraviolet absorber having a maximum absorption wavelength of 350 nm or more and 370 nm or less when dissolved in a chloroform solution, in a same composition as the second substrate having a thickness of 2 mm,
a light transmittance measured in the same composition as the second substrate having the thickness of 2 mm with respect to a light having a wavelength of 440 nm is 80% or more,
a light transmittance measured in the same composition as the second substrate having the thickness of 2 mm with respect to a light having a wavelength of 420 nm is 70% or less, and
a light transmittance measured in the same composition as the second substrate having the thickness of 2 mm with respect to a light having a wavelength of 410 nm is 10% or less.

7. The lens according to claim 6, wherein
the ultraviolet absorber includes at least one compound of a benzotriazole-based compound, a benzophenone-based compound, and a salicylic ester-based compound.

8. The lens according to claim 7, wherein
the ultraviolet absorber is a benzotriazole-based compound comprised of 2-(2-hydroxy-3-t-butyl-5-methylphenyl)-chlorobenzotriazole.

9. The lens according to claim 1, wherein
the additive includes a rare earth metal compound or an organic dye.

10. The lens according to claim 9, wherein:
the additive includes a rare earth metal compound or an organic dye having an absorption maximum wavelength in a wavelength region between 440 and 580 nm, and
a light transmittance with respect to a light having a wavelength of 580 nm is 60% or more and 90% or less.

11. The lens according to claim 1, wherein
the adhesive layer is comprised of a photocuring adhesive.

* * * * *